United States Patent

Cannell

[15] 3,692,854
[45] Sept. 19, 1972

[54] CYCLODIMERIZATION PROCESS

[72] Inventor: Lawrence G. Cannell, Berkeley, Calif. 94707

[73] Assignee: Shell Oil Company, New York, N.Y.

[22] Filed: March 22, 1971

[21] Appl. No.: 126,984

[52] U.S. Cl. ......260/666 A, 260/666 B, 260/666 PY, 260/677 R, 260/680 B, 260/683.15 D
[51] Int. Cl. ..................C07c 13/28, C07c 13/06
[58] Field of Search .........260/666 A, 666 B, 677 R, 680 B, 260/683.15 D

[56] References Cited

UNITED STATES PATENTS

| | | | |
|---|---|---|---|
| 3,258,501 | 6/1966 | Cannell | 260/666 |
| 3,420,899 | 1/1969 | Longiave et al. | 260/666 |
| 3,496,129 | 2/1970 | Wismer et al. | 260/666 |
| 3,567,792 | 3/1971 | Bozik et al. | 260/677 |

*Primary Examiner*—Delbert E. Gantz
*Assistant Examiner*—C. E. Spresser
*Attorney*—Howard W. Haworth and Henry C. Geller

[57] ABSTRACT

Vinylcyclobutanes are prepared by cyclocodimerizing a diene and a monoolefin, in liquid phase solution, in the presence of a catalyst system containing an organo-titanium compound.

7 Claims, No Drawings

CYCLODIMERIZATION PROCESS

BACKGROUND OF THE INVENTION

Linear dimerization, oligomerization, cyclooligomerization, and dis-proportionation of olefins by homogeneous transition metal complexes have been studied extensively since the early 1960's. Such catalysts offer the possibility of achieving product types and product selectivities previously unobtainable by conventional acid or base catalysis. The unsaturated products of the indicated olefin conversion processes may be further transformed to industrially useful polymers and functional derivatives.

Until recently, the above-identified olefin conversion processes have not been applied to the synthesis of vinylcyclobutanes, which are useful as starting materials in the preparation of co- and homo-polymers, nematocides and perfumes.

Preparation of vinylcyclobutane itself has followed classical methods of organic systhesis. Vogel et al. (Ann., 615: 29, 1958) prepared vinylcyclobutane in low yield by the 1,2 addition of ketene to butadiene, with subsequent Wolf-Kishner reduction of the vinylcyclobutanone. Overberger et al. (J. Polymer Sci., Part A, 2: 755, 1964) have disclosed an improved-yield preparation involving some seven steps. Recently, Bartlett et al. (J.A.C.S., 90: 6071, 1968) found that the addition product of ethylene and butadiene at 175°C and 6,000 psi consisted of 99.98 percent cyclohexene and 0.02 percent vinylcyclobutane.

Montacatini Edison, Belgian Pat. No. 750,288 (issued Nov. 12, 1970) disclose the formation of vinylcyclobutanes by reacting bicyclo(2.2.1)hepta-2,5-diene with either 1,3 butadiene or isoprene in the presence of a ternary catalyst system comprising (a) an iron compound, (b) an ether or phosphine, and (c) an organo-aluminum or organo-magnesium compound.

In view of the attractive nature of vinylcylobutanes as organic intermediates and polymerizable monomers and the fact that classical methods of preparation are cumbersome and relatively uneconomical, the need for a simple preparative technique, which employs readily available and comparatively inexpensive precursors, is apparent.

SUMMARY OF THE INVENTION

It has now been found that $C_4$-$C_5$ straight chain conjugated dienes and certain monoolefins are cyclocodimerized in liquid phase solution to yield vinylcyclobutanes with a catalyst system comprising an organo-titanium compound.

DESCRIPTION OF THE PREFERRED EMBODIMENTS

A. The Organo-Titanium Catalyst

The titanium catalyst is an organo-titanium compound wherein the titanium in the reaction system has an apparent oxidation state no greater than IV. In one modification of the invention, suitable titanium catalysts comprise those compounds represented by the formula $$R_4Ti \qquad (I)$$

wherein each R independently is a monovalent radical such as methyl, allyl, phenyl, benzyl or cyclopentadienyl, with the proviso that no more than one R substituent is cyclopentadienyl. Illustrative of such hydrocarbyl organo-titanium compounds are tetrabenzyltitanium, tetraphenyltitanium, cyclopentadienyltitanium tribenzyl, cyclopentadienyltitanium trimethyl, cyclopentadienyltitanium triphenyl, dimethyldibenzyltitanium and triphenylbenzyltitanium.

In a second modification of the invention, the catalyst is a two-component catalyst comprising (1) an organo-titanium compound wherein the titanium is in an apparent oxidation state of III or IV and (2) a hydrido, aryl or alkyl derivative of at least one metal of Group IA, IIA or IIIA of the Periodic Table.

In this second modification employing a two-component catalyst, organo-titanium compounds suitable utilized as catalyst components are represented by the formula $$S_4Ti \qquad (II)$$

wherein S independently is (a) alkoxy or aryloxy of up to 10 carbon atoms, (b) chlorine or bromine, or (c) R, where R has the previously stated significance. Thus, the titanium component of the two component catalyst system is a compound of formula (I) above, a tetraalkyl titanate ester such as tetrabutyltitinate, tetraethyltitinate, tetrapropyltitinate or dimethyldioctyltitinate, or a halogen-containing material such as, for instance, cyclopentadienyltitanium trichloride.

Suitably employed as the second component of the two component catalyst are metal hydrides such as lithium aluminum hydride, sodium hydride, calcium hydride and potassium hydride; metal alkyls including n-butyl lithium, diethyl magnesium, octyl sodium, and triethyl aluminum; and metal aryls illustrated by phenyl sodium, phenyl lithium, and cyclopentadienylaluminum diethyl. Preferred as the second catalyst component are aluminum hydrides, aluminum alkyls and alkyl aluminum hydrides of up to 8 carbon atoms in each alkyl group.

In the two-component catalysts of the invention, the ratio of titanium compound (1) to Group I–IIIA metal compound (2) is not critical, although molar ratios from about 0.5:1 to about 1:10 are suitable. Molar ratios in the higher end of the indicated range, i.e., 1:6–10, are advantageously employed when the titanium component contains one or more halogen substituents.

In either modification of the catalysts of the invention, additional catalyst modifiers are on occasion usefully employed. Such catalyst modifiers comprise stabilizing ligands such as amines, phosphines, stibenes, arsines, ethers and the like. Bidentate amines of the pyridine type are particularly preferred catalyst modifiers. In some instances, the modifier, which may be soluble or insoluble, is present in substantial quantities, e.g., up to about 100 moles per mole of titanium compound, and serves as the reaction diluent as well as the catalyst modifier. In many cases, however, no more than minor amounts, e.g., amounts equimolar with the titanium compound, are employed, and in most instances, no catalyst modifier is employed.

B. The Ethylenic Reactant

The ethylenic reactant comprises ethylene and certain hydrocarbon substituted ethylenes wherein the carbon-carbon double bond is activated or rendered more available for reaction by inclusion within a Diels Alder adduct containing at least two carbocyclic rings, at least one of which has no more than 5 carbon atoms in the ring and contains a carbon-carbon double bond. Generically, such ethylenic reactants are characterized by the formula

wherein X independently is hydrogen or both X substituents together form a divalent radical selected from

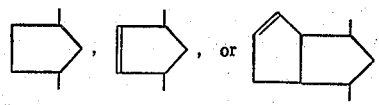

Such ethylenic reactants are ethylene, bicyclo(2.2.1)hepta-2,5-diene, bicyclo(2.2.1)hept-2-ene, and tricyclo(5.2.1.0$^{2,6}$)deca-3,9-diene. Ethylene is the preferred ethylenic reactant.

C. The Diene Reactant

The diene reactant which is employed in the cyclodimerization process of producing vinylcyclobutanes is a $C_4$–$C_5$ hydrocarbon, conjugated alkadiene. These are butadiene and piperylene.

D. Reaction Conditions

The temperature at which the cyclocodimerization reaction of the present invention proceeds may be varied over a wide range. It has been found that the reaction proceeds satisfactorily at temperatures from about 80° to about 200°C. Preferably, the cyclocodimerization is conducted at from about 130° to about 170°C.

The pressures employed may vary from ambient to as much as 2,000 psi or more, and will in part depend upon the amount and volatility of the mono-olefinic and diene organic substrates which are present, since the reaction is conducted in the liquid phase. The preferred range of operating pressures lies between about 200 and about 1,500 psi.

It is desirable to conduct the cyclocodimerization in the presence of an organic diluent which does not adversely affect the cyclodimerization reaction. Representative of these diluents are aromatic hydrocarbons such as benzene, toluene, and xylene, and aliphatic hydrocarbons such as hexane, heptane, pentane, and isopentane. Other types of organic diluents, e.g., ethers such as tetrahydrofuran, 1,2-dimethoxyethane and dioxane, are also suitably employed as solvents and additionally function as catalyst modifiers.

The ratios of monoolefinic and diene reactants with respect to the titanium catalysts are variable. Generally, per mole of titanium in the cyclocodimerization reaction mixture, it is desirable to have from about 90 to about 1,000 moles of monoolefin and from 90 to about 300 moles of diene. Preferably, the molar ratio of titanium:monoolefin: diene is 1:90–600:90–200. The amount of total unsaturated reactant, i.e., monoolefin plus diene, suitably lies within the range of about 400 to about 1,200 moles per mole of titanium cyclocodimerization catalyst. Preferably, from about 400 to about 800 moles of total unsaturated reactant per mole of titanium is employed in forming vinylcyclobutane. Generally, it is preferable to have the monoolefin in excess, particularly where the monoolefin is ethylene.

The cyclodimerization is conducted by contacting the reactants and catalyst in the reaction diluent in the liquid phase. Such contacting can be effected batchwise or in a continuous manner and the entire amounts of reactants are initially mixed or one reactant can be added to the remaining reaction mixture components in increments.

Subsequent to reaction, the product mixture is separated and the vinylcyclobutane product is recovered by conventional means, e.g., fractional distillation, selective extraction and gas-liquid chromatographic techniques.

Vinylcyclobutane products result from cyclocodimerization of the ethylenic and diene reactants. Illustrative of such products are vinylcyclobutane produced from reaction of ethylene and butadiene, vinylmethylcyclobutane produced from ethylene and piperylene and 3-vinyltricyclo(4.2.1.0$^{2,5}$)nonane produced by reaction of butadiene and bicyclo(2.2.1)hept-2-ene.

The vinylcyclobutane products as such, or in an isomerized configuration, are useful as monomeric substrates for high molecular weight polymers. For instance, vinylcyclobutane has been polymerized by Overberger et al. (*J. Polymer Sci.*, Part A, 2: 755, 1964).

EXAMPLES

With the exception of run 153 in Example III, all of the cyclocodimerizations were carried out in an 84 ml autoclave equipped with a magnetic stirrer. Argon was used to sweep the autoclave before loading with monoolefins and dienes.

Where a Group I–IIIA organo-metallic compound formed a part of the catalyst system, this material was generally added to the diluent or a mixture of diluent and the organo-titanium compound, with mixing at 0°C, and then the diene and monoolefin substrates were added.

Where three values are reported for the temperature employed during a single run, these correspond to the initial temperature, the maximum temperature which was achieved due to the exothermisity of the cyclocodimerization, and the final temperature. Similarly, where two pressures are reported for an individual run, these correspond to the maximum and final pressure recorded.

In the tables which accompany the examples, the following abbreviations are employed:

I. Titanium Materials
 (n-$C_4H_9O$)$_4$Ti — tetra-n-butoxytitanium
 $C_5H_5$Ti($CH_2$Ph)$_3$ — cyclopentadienyltitanium tribenzyl
 (AcAc)$_2$TiO — titanylacetylacetonate
 $C_5H_5$TiCl$_3$ — cyclopentadienyltitanium trichloride II. Second Component of Two-Component Catalyst System
 Et$_3$Al — triethylaluminum
 n-$C_4H_9$Li — n-butyllithium
 LiAlH$_4$ — lithium aluminum hydride
 Et$_3$Al$_2$Cl$_3$ — *ethylaluminum sesquichloride*

III. Catalyst Modifiers — i.e., Stabilizing Ligands

Bipy — 2,2'-bipyridyl
Ph₃P — triphenylphosphine
Py — pyridine
Phen — 1,10-phenanthrolene
TMEDA — tetramethylenediamine The solvent employed in the cyclocodimerization of the present invention is not limited to hydrocarbons, but may include other types of organics, such as tetrahydrofuran, 1,2-dimethoxyethane, and dioxane, as shown in runs 123, 124, and 167, respectively.

TABLE 1

Butadiene-Ethylene Cyclocodimerization with $C_5H_5Ti(CH_2Ph)_3$

| Run | 40 | 63 | 61 | 71 | 69 |
|---|---|---|---|---|---|
| Reactants: | | | | | |
| Ti, mmoles | 0.75 | 1.12 | 1.12 | 1.12 | 1.12 |
| Butadiene, g | 10.3 | 7.0 | 6.0 | 15.5 | 7.1 |
| Ethylene, g | 2.5 | 11.5 | 14.0 | 2.5 | 18.0 |
| Reaction conditions: | | | | | |
| Duration, hrs | 1.67 | 0.25 | 1.0 | ᵇ 3 | 0.5 |
| Temperature, °C | 150/160/135 | 135/160/140 | 135/160/135 | 155/190/175 | 138/156/132 |
| Pressure, p.s.i.g | 380/242 | 1,024/1,000 | 1,260/1,192 | 604/520 | 1,688/1,370 |
| Approximate conversion, percent: | | | | | |
| Butadiene | ~99 | ~80 | ~85 | ~60 | 90 |
| Ethylene | ~38 | ~10 | ~13 | 30 | 8 |
| Selectivities, percent w.ᵃ: | | | | | |
| Butenes | 2.0 | 8 | 5.1 | 2.4 | 15.7 |
| C₆s | 33.3 | 48 | 64.2 | 33.5 | 42 |
| 4-vinylcyclohexene-1 | 49.0 | 40 | 25.1 | 43.8 | 37 |
| Other C₆s | 9.1 | 3 | 3.0 | 16.0 | 3 |
| C₁₀s | 2.9 | | 0.5 } | 4.3 | 2.3 |
| Heavy ends | 3.7 | 1 | 2.1 } | | |
| Others | | 1.3 | 0.9 | 5.7 | 1.7 |
| C₆ olefins, percent w.: | | | | | |
| Ethylene trimer | 0.7 | 3.9 | 4.0 | 1.2 | 7.5 |
| Vinylcyclobutane | 23.9 | 38.2 | 28.8 | 47.0 | 47.4 |
| Hexadienes | 44.3 | 45.5 | 45.6 | 37.9 | 35.5 |
| Ethylidenecyclobutane | 31.1 | 11.1 | 20.7 | 8.2 | 7.9 |

ᵃ Gas chromatography of C₄-C₂₀ liquid product.  ᵇ Minutes.

EXAMPLE I. Butadiene-Ethylene Cyclocodimerization with Cyclopentadienyl-Titanium Tribenzyl Varying amounts of cyclopentadienyltitanium tribenzyl were mixed with butadiene and ethylene in 10 ml of toluene, and the reaction was permitted to proceed for varying amounts of time. Reaction conditions, quantities of reactants and conversions and selectivities, as determined by gas-liquid chromatographic (GLC) analysis, were reported in Table I. Analysis for the C₆ olefins were confirmed by hydrogenation of this fraction over Raney nickel at 100°C, under which condition vinylcyclobutane was converted to ethylcyclobutane.

EXAMPLE II. Butadiene-Bicyclic Olefin Cyclocodimerization with Cyclopentadienyl-Titanium Tribenzyl Monolefinic materials other than ethylene may be cyclocodimerized with a diene. Thus, when butadiene is reacted with a strained bicyclic olefin such as bicyclo(2.2.1)hepa-2,5-diene or bicyclo(2.2.1)hept-2-ene high yields to the C₁₁ polycyclic codimers, identified by nuclear magnetic resonance (NMR), were achieved. Details of such cyclocodimerizations were shown in Table II.

EXAMPLE III. Butadiene-Ethylene Cyclocodimerizations in the Presence of Tetra-n-butoxytitanium/Triethylaluminum In a series of runs detailed in Table III, butadiene and ethylene were cyclocodimerized to vinylcyclobutane by a catalyst system consisting of tetra-n-butoxytitanium and triethylaluminum. The reaction was effected in the presence and absence of various stabilizing ligands.

TABLE II

Butadiene-Bicyclic Olefin Cyclocodimerization with $C_5H_5Ti(CH_2Ph)_3$

| Run | 143 | 145 | 146 |
|---|---|---|---|
| Reactants: | | | |
| Ti, mmoles | 1.0 | 1.0 | 1.0 |
| Butadiene, g | 14.0 | 14.0 | 14.0 |
| Olefin | 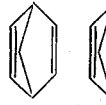 | 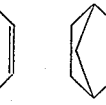 |  |
| Amt., g | 9.0 | 9.0 | 9.0 |
| Solvent | None | None | Toluene |
| Amt., ml | | | 10.0 |
| Reaction conditions: | | | |
| Duration, hrs | 2.1 | 1.0 | 1.0 |
| Temperature, °C | 130-140 | 130-140 | 134-138 |
| Pressure, p.s.i.g | 280/35 | 280/198 | 220/116 |
| Conversion, percent: | | | |
| Butadiene | 99 | 67 | 38 |
| Olefin | 91 | 59 | 81 |
| Selectivity, percent w.ᵃ: | | | |
| Cyclobutane codimer | 40 | 67.5 | 46.1 |
| 4-vinylcyclohexene-1 | 10.1 | 13.5 | 36.8 |
| Other C₈s | | | 0.7 |
| Trimer | 29.9 | 3.0 | 3.4 |
| High boilers | 20.0 | 16.0 | 13.0 |
| C₁₁ composition, percent w.: | | | |
| 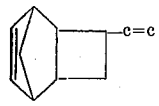 | 67.0 | 83.2 | |
| | | | 95.0 |
| Other C₁₁H₁₄s | 34.0 | 16.8 | |
| Other C₁₁H₁₆s | | | 5.0 |

ᵃ Via distillation.

TABLE III

Butadiene-Ethylene Cyclocodimerization by (n-C₄H₉O)₄Ti/Et₃Al

| Run | 79 | 105 | 107 | 108 | 110 | 112 | 123 | 124 | 167 | 153 |
|---|---|---|---|---|---|---|---|---|---|---|
| Reactants: | | | | | | | | | | |
| Ti, mmoles | 1.0 | 1.0 | 1.0 | 1.0 | 1.0 | 1.0 | 1.0 | 1.0 | 1.0 | |
| Et₃Al, mmoles | 2.5 | 2.5 | 2.5 | 2.5 | 2.5 | 2.5 | 2.5 | 2.5 | 2.5 | 45 |
| Ligand | | Bipy | Ph₃P | Py | Phen | TMEDA | | | | 112 |
| Mmoles | | 1.0 | 2.0 | 4.0 | 1.0 | 1.0 | | | | Phen |
| Butadiene, g | 7.5 | 7.5 | 7.5 | 9.5 | 7.5 | 7.5 | 7.5 | 7.0 | 7.0 | 45 |
| Ethylene, g | 12.5 | 13.5 | 15.5 | 14 | 11.5 | 17.0 | 13.5 | 12.0 | 13.5 | 230 |
| Solvent | | | | | | | | | | 370 |
| Ml | Toluene 10 | Toluene 10 | Toluene 10 | Toluene 10 | Toluene 20 | Toluene 10 | THF 10 | (CH₃OCH₂)₂ 10 | Dioxane 10 | Toluene 1,000 |
| Reaction conditions: | | | | | | | | | | |
| Duration, hrs | 0.5 | 0.5 | 0.5 | 0.5 | 1.0 | 0.5 | 1.0 | 1.0 | 1.0 | 1.67 |
| Temp, °C | 130/162/148 | 130 | 120/143/128 | 130/135/130 | 170 | 130 | 150 | 150 | 150 | 170–175 |
| Press., p.s.i.g | 1,136/1,040 | 1,392/1,272 | 1,376/1,250 | 1,376/1,280 | 1,232/1,110 | 1,464/1,344 | 1,376/1,220 | 1,216/1,088 | 1,328/1,108 | 1,375/1,290 |
| Approximate conversion, percent: | | | | | | | | | | |
| Butadiene | 90 | ~90 | 60 | 73 | 70 | 55 | 85 | 79 | 94 | 96 |
| Ethylene | 20 | ~23 | 11 | 10 | 15 | 27 | 12 | 17 | 17 | 20–24 |
| Selectivity, percent w.[a]: | | | | | | | | | | |
| Butenes | 30 | 2.4 | 27 | 24 | 2.8 | 31.8 | 9.3 | 6.3 | 15.8 | 16 |
| C₆S | 50 | 64.8 | 46 | 34 | 75.2 | 47.6 | 74.9 | 72.0 | 63.2 | 60.1 |
| 4-vinylcyclohexene-1 | 7 | 17.0 | 13 | 23 | 17.8 | 10.0 | 10.0 | 14.8 | 13.2 | 18.6 |
| Other C₆S | 4 | 3.0 | 6 | 1 | 1.8 | 3.0 | 1.8 | 2.5 | 3.9 | 3.7 |
| C₁₀–C₁₂S | 9 | 5.9 | 8 | 18 | 2.5 | 5.1 | 4.0 | 4.4 | 3.8 | [b]11.2 |
| Polymer (solid) | | 6.9 | | | 0 | 2.5 | | | | 4.8 |
| Butadiene as high molecular weight oligomers, gms | 4 | 0 | 2.5 | 3 | 0 | 2 | 3 | 0 | 2.7 | |
| C₆ olefin composition, percent w: | | | | | | | | | | |
| Ethylene trimer | 10.4 | 2.3 | 16.1 | 15.0 | 2.0 | 12.0 | 3.8 | 3.0 | 5.6 | 1.4 |
| Vinylcyclobutane | 32.5 | 42.0 | 27.8 | 40.1 | 42.4 | 38.8 | 42.8 | 43.4 | 40.7 | 37.7 |
| Hexadienes | 40.7 | 47.9 | 44.6 | 36.2 | 47.3 | 40.8 | 51.3 | 50.8 | 51.5 | 49.5 |
| Ethylidencyclobutene | 1.9 | 2.1 | 3.0 | 2.9 | 1.5 | 5.4 | 0.8 | 1.7 | Trace | 1.2 |
| Other | 4.5 | 5.7 | 8.5 | 5.8 | 6.8 | 3.0 | 1.3 | 1.1 | 2.2 | 10.2 |

[a] Gas chromatography of C₄–C₂₀ liquid product.
[b] Includes higher boiling liquid products.

Run 153 proceded in a one gallon autoclave. The triethyl aluminum was added to a toluene solution of the tetrabutyltitinate and the 1,10-phenanthroline at below 0°C. The reactive organic substrates were then added, and the reaction allowed to proceed. As in the previous two Examples, the composition of the $C_6$ fraction was verified by hydrogenation.

EXAMPLE IV. Butadiene-Ethylene Cyclocodimerization by Tetrabenzyltitanium

Tetrabenzyltitanium is representative of other organo-titanium compounds which catalyze the cyclocodimerization of a diene with a monoolefin. When 1.0 mmole of tetrabenzyltitanium and 1.0 millimoles of 2,2'-bipyridyl, dissolved in 20 milliliters of toluene, were mixed with 7.0 grams of butadiene and 11.5 grams of ethylene, cyclocodimerization was effected for a period of 2.0 hours at a temperature of 140° to 150°C. The maximum and final pressure observed during this reaction were 1,016 and 982 psig, respectively. Butadiene and ethylene conversions during this period were 79 and 18 percent, respectively. Selectivities to butenes, $C_6$s,4-vinylcyclohexane-1, other $C_8$, and polymers were 4.3, 64.0, 14.5, 2.5 and 14.7 percent by weight, respectively. An analysis of the $C_6$ olefin fraction indicated 2.5%w ethylene trimer, 72.8%w vinylcyclobutane, 20.8%w hexadienes, a trace of ethylidene cyclobutadiene, and 3.9 percent heavier materials, respectively. Under roughly equivalent reaction conditions, but in the absence of an added ligand, the $C_6$ selectivity was only 24.0%w, the polymer make was 47.4%w, and the vinylcyclobutane present in the $C_6$ olefin fraction was 45.1%w.

EXAMPLE V. Cyclocodimerization of Pentadiene and Ethylene

To 1.5 millimoles of cyclopentadienyltitanium tribenzyl dissolved in 5 ml of n-nonane were added 13.4 grams of 1,3-pentadiene and 12.0 grams of ethylene. Cyclocodimerization was allowed to proceed for 0.5 hours at a temperature of 150°C, during which period the maximum and final pressures were 1,288 and 1,120 psig, respectively. Under these conditions the pentadiene and ethylene conversions were 40 and 19 percent, respectively. Selectivity to butenes was 0.8%w, to $C_7$s was 96.5%w, and to $C_{10}$s was 2.7%w. The major olefinic products were separated by gas chromatography and identified by NMR as cis- and trans-2-methyl-vinylcyclobutane and 3-methyl-1-cis-4-hexadiene. After the product had been hydrogenated, gas chromatography, alone or in combination with mass spectral analysis, revealed the following weight compositions: 52 percent 2-methyl-1-ethylcyclobutanes (cis and trans), 31 percent 3-methylhexane, 2 percent n-heptane, 3 percent methylcyclohexane, and 12 percent unidentifiable.

EXAMPLE VI

A modified titanium catalyst component, prepared by reacting tetra-butyltitanate with 8-hydroxyquinoline (13%w titanium and 5.5%w nitrogen by analysis), was used as a catalyst precursor. In 10 ml of toluene, 0.41 grams of the titanium chelate and 2.5 mmoles of triethylaluminum were dissolved. To the catalyst-containing solvent were added 8 grams of butadiene and 16 grams of ethylene. The cyclocodimerization was allowed to proceed for approximately 30 minutes at a temperature of 146° to 148°C. After isolation and hydrogenation of the $C_6$ olefin fraction, gas chromatography indicated a content of 49.3 percent ethylcyclobutane, 49.2 percent n-hexane, and 1.5 percent 3-methylpentane.

EXAMPLE VII. Butadiene-Ethylene Cyclocodimerizations Employing Various Two-Component Catalyst Systems Butadiene and ethylene were cyclocodimerized to vinylcyclobutane with a variety of two-component catalyst systems shown in Table IV. As shown in run 103, a higher molar ratio of reducing agent to titanium compound is employed when the latter contains halogen substituents.

TABLE IV

Butadiene-Ethylene Cyclocodimerization With Various Two-Component Catalyst Systems

| Run | 97 | 81 | 74 | 102 | 103 |
|---|---|---|---|---|---|
| Reactants: | | | | | |
| Ti Catalyst | $(n-C_4H_9O)_4Ti$ | $(n-C_4H_9O)_4Ti$ | $(n-C_4H_9O)_4Ti$ | $(AcAc)_2TiO$ | $C_5H_5TiCl$ |
| Mmoles | 1.0 | 1.5 | 1.0 | 1.0 | 1.0 |
| Reducing agent | $n-C_4H_9Li$ | $Et_3Al_2Cl_3+Et_3Al$ | $LiAlH_4$ | $Et_3Al$ | $Et_3Al$ |
| Mmoles | 3.0 | 1.0, 3.75 | 0.95 | 7.5 | 7.5 |
| Butadiene, g | 8.5 | 8.0 | 8.5 | 8.0 | 7.0 |
| Ethylene, g | 13.2 | 12.5 | 17.5 | 12.0 | 9.5 |
| Solvent | THF | Toluene | THF | THF | THF |
| Ml | 10 | 10 | 10 | 10 | 10 |
| Reaction conditions: | | | | | |
| Duration, hrs | 1.5 | 17 | 4.3 | 1.75 | 0.25 |
| Temp. range, °C | 130–150 | 135–150 | ~150 | 150–174 | ~150 |
| Press., p.s.i.g | 1,196/1,160 | 1,224/1,048 | 1,800/1,624 | 1,230/1,208 | 1,096/1,048 |
| Approximate conversion, percent: | | | | | |
| Butadiene | 96 | 88 | 62 | 91 | 86 |
| Ethylene | 12 | 10 | 6 | 10 | 13 |
| Selectivity, percent [a]: | | | | | |
| Butenes | 51 | [b]1 | 1.4 | 7.5 | 17 |
| $C_6$s | 18 | 50 | 45 | 68.5 | 64 |
| 4-vinylcyclobutane-1 [c] | 17 | 32 | 27 | 22 | 15 |
| Other $C_8$s–$C_{12}$s | 14 | 11 | 15.6 | 2 | 4 |
| Polymer (solid) | 0 | 6 | 11 | 0 | 0 |
| Butadiene as high molecular weight oligomer, g | 7.0 | 0.8 | 0 | 5 | |
| $C_6$ olefin composition, percent w.: | | | | | |
| Ethylene trimer | 33 | 1 | 1 | 5.8 | 2.9 |
| Vinylcyclobutane | 18 | 37 | 12 | 60.3 | 31.3 |
| 1,4-hexadiene | 22 | 38 | 27 | 28.7 | Trace |
| Ethylidenecyclobutane | | Trace | Trace | 0.3 | 43.4 |
| Cyclohexaene [d] | 27 | 21 | 59 | 2.6 | 0.6 |
| 2,4 hexadienes and others | | 3 | 1 | 2.3 | 12.7 |

[a] Gas chromatography of $C_4$–$C_{20}$ liquid product.
[b] May be low due to handling losses.
[c] Thermal, Diels-Alder dimer.
[d] Thermal product.

I claim as my invention:

1. A process for producing vinylcyclobutanes by cyclocodimerization which comprises contacting an ethylenic reactant selected from ethylene and ethylenic Diels-Alder adducts of at least two carboxylic rings, at least one of which has no more than five carbon atoms and contains a carbon-carbon double bond, with a $C_4$-$C_5$ straight-chain hydrocarbon conjugated alkadiene, in liquid phase solution in the presence of a titanium catalyst having an apparent oxidation state no greater than IV, said catalyst being selected from a. titanium compounds of the formula $$R_4Ti$$

wherein R independently is methyl, allyl, phenyl, benzyl or cyclopentadienyl, with the proviso that no more than one R is cyclopentadienyl, and b. two component titanium catalysts comprising
1. titanium compounds of the formula $$S_4Ti$$

wherein S is (a) alkoxy or aryloxy, (b) chlorine or bromine, or c. R as previously defined, and 2. hydrido, alkyl or aryl derivatives of at least one metal of Groups IA, IIA or IIIA of the Periodic Table.

2. The process of claim 1 wherein the ethylenic reactant is selected from the group consisting of ethylene, bicyclo (2.2.1)hepta-2,5-diene, bicyclo-(2.2.1)hept-2-ene, and tricyclo($5.2.1.0^{2,6}$)deca-3,9-diene.

3. The process of claim 1 wherein the $C_4$-$C_5$ straight chain hydrocarbon conjugated alkadiene is butadiene.

4. The process of claim 1 wherein the cyclocodimerization proceeds in the presence of an organic diluent selected from the group consisting of aromatic and aliphatic hydrocarbons and ethers.

5. The process of claim 1 wherein said derivative of a metal of Groups IA, IIA, or IIIA of the Periodic Table is triethylaluminum.

6. The process of claim 1 wherein the cyclocodimerization is conducted in the additional presence of titanium catalyst modifiers comprising stabilizing ligands.

7. The process of claim 6 wherein the stabilizing ligand is selected from the group consisting of 2,2'-bipyridyl and 1,10-phenanthrolene.

* * * * *